United States Patent [19]

Paul et al.

[11] Patent Number: 5,058,537
[45] Date of Patent: Oct. 22, 1991

[54] OPTIMIZED HIGH PRESSURE INTERNAL COMBUSTION ENGINES

[76] Inventors: Marius A. Paul; Ana Paul, both of 1100 E. Orangethorpe Ave., Ste. 140, Anaheim, Calif. 92801

[21] Appl. No.: 341,533

[22] Filed: Apr. 21, 1989

[51] Int. Cl.$^5$ .............................................. F02B 25/08
[52] U.S. Cl. ........................... 123/51 BA; 123/193 P; 123/117 AC; 123/299; 60/609
[58] Field of Search ........... 123/51 A, 51 AA, 51 BB, 123/51 B, 51 BA, 52 A, 65 BA, 193 P, 193 CP, 197 AB, 197 AC, 299; 60/607, 609, 612, 624

[56] References Cited

U.S. PATENT DOCUMENTS

| | | | |
|---|---|---|---|
| 1,127,772 | 2/1915 | Junkers | 123/299 |
| 1,942,571 | 1/1934 | Ricardo | 123/51 BA |
| 2,091,451 | 8/1937 | Phillips | 123/21 |
| 2,236,950 | 4/1941 | Ricardo | 123/257 |
| 2,375,006 | 5/1945 | Larrecq | 60/13 |
| 2,416,389 | 2/1946 | Heppner | 60/35.6 |
| 2,468,157 | 9/1946 | Barlow et al. | 170/135.28 |
| 2,525,450 | 4/1951 | Roesch | 170/135.72 |
| 2,570,616 | 10/1951 | Welsh | 123/299 |
| 2,573,301 | 10/1951 | Berlyn | 123/41.84 |
| 2,575,682 | 2/1951 | Price | 60/35 |
| 2,606,538 | 3/1952 | Malin | 123/301 |
| 2,620,621 | 4/1952 | Nettel | 60/13 |
| 2,658,487 | 10/1952 | Basabe | 123/275 |
| 2,840,059 | 3/1954 | Buchi | 123/262 |
| 2,853,227 | 9/1958 | Beardsley | 230/114 |
| 2,949,899 | 8/1960 | Jacklin | 123/51 BA |
| 2,994,187 | 8/1961 | Kelgard | 60/13 |
| 3,117,566 | 1/1964 | Venediger | 123/51 BA |
| 3,465,518 | 12/1966 | Erwin | 60/39 |
| 3,575,146 | 4/1971 | Creighton et al. | 123/299 |
| 3,628,511 | 12/1971 | Fischer | 123/41 |
| 4,270,494 | 6/1981 | Garter et al. | 123/41.35 |
| 4,291,535 | 9/1981 | Goloff | 60/602 |
| 4,372,179 | 2/1983 | Dolenc et al. | 74/579 |
| 4,480,968 | 10/1984 | Duerr | 417/380 |
| 4,539,948 | 9/1985 | Toepel | 123/65 |
| 4,656,992 | 4/1987 | Oonaka et al. | 123/559 |
| 4,791,787 | 12/1988 | Paul et al. | 60/605 |
| 4,809,646 | 3/1989 | Paul et al. | 123/51 B |
| 4,815,421 | 3/1989 | Paul et al. | 123/65 PE |
| 4,843,813 | 7/1989 | Paul et al. | 60/39.161 |
| 4,843,821 | 7/1989 | Paul et al. | 60/605.1 |
| 4,858,566 | 8/1989 | Paul et al. | 123/41.35 |
| 4,872,433 | 10/1989 | Paul et al. | 123/257 |
| 4,884,407 | 12/1989 | Hatanaka | 60/624 |
| 4,903,488 | 2/1990 | Shibata | 60/609 |

FOREIGN PATENT DOCUMENTS

| | | | |
|---|---|---|---|
| 1020486 | 12/1957 | Fed. Rep. of Germany | 60/609 |
| 1231959 | 1/1967 | Fed. Rep. of Germany | |
| 3000145 | 12/1979 | Fed. Rep. of Germany | |
| 57-8364 | 5/1982 | Japan | |
| WO86/04388 | 7/1986 | PCT Int'l Appl. | |
| 562343 | 6/1944 | United Kingdom | 123/299 |
| 625948 | 7/1949 | United Kingdom | |
| 874897 | 8/1961 | United Kingdom | |

*Primary Examiner*—Noah P. Kamen
*Attorney, Agent, or Firm*—Bielen, Peterson & Lampe

[57] ABSTRACT

An improved high pressure, high r.p.m. engine having a single cylinder with opposed pistons reciprocating in the cylinder and each piston being connected to dual connecting rods that are connected to counterrotating crankshafts, the cylinder having a central collar between the heads of the opposed pistons that form a specially configured combustion chamber for high turbulence mixture of air and fuel injected from a plurality of fuel injectors peripherally arranged around the cylinder, the pistons being operated with a cycle phase shift to prolong the period of peak compression and provide a double squish action for improved fuel air mixture, the air being supplied under high compression from a counterrotating turboblower assembly that is in part driven by the engine drive train and in part driven by the expansion gases of the combustion process, the engine being provided with specially designed high pressure pistons that have an axially symmetrical piston head and a spherical bearing mount to a wrist pin assembly having dual rolling wrist pins for eliminating side thrust of the piston head and maximizing the projected surface area for transmission of piston thrust forces from a piston head to the connecting rods and crankshafts.

30 Claims, 8 Drawing Sheets

OPTIMIZED HIGH PRESSURE INTERNAL COMBUSTION ENGINES

BACKGROUND OF THE INVENTION

This invention relates to an optimized high pressure internal combustion engine that intergrates certain features of our opposed piston engine with dual connecting rods and crank shafts as disclosed in our U.S. Pat. No. 4,791,787 entitled, REGENERATIVE THERMAL ENGINE issued on Dec. 20, 1988 and in our U.S. Pat. No. 4,809,646 entitled, HIGH PRESSURE RECIPROCATOR COMPONENTS, issued Mar. 7, 1989. The improvements herein described relate both to improved engine components and to improved engine operation.

In designing a high pressure, high r.p.m. engine that has auto ignition of the fuel, the configuration of the combustion chamber and the process of injection of the fuel become critical factors in achieving full combustion of the injected fuel without excessively high temperature zones that generate undesirable nitrogen oxides or without uniform flame fronts that can cause engine knock and piston damage. In a highly supercharged engine combustion pressures and temperatures can reach a level that produces deformations and asymmetries in the piston head that cause excessive friction or require excessive tolerances that inhibit efficient sealing. Furthermore, extremely high pressures in a reciprocal engine result in oil film breakdown in conventional wrist pin assemblies that connect the piston to a conventional piston rod and crank shaft assembly. At a high level of supercharging associated with a high r.p.m. engine, the time within which to efficiently burn the fuels for maximized development of power is extremely short. Inefficient combustion results in fuel waste and power loss as well as increases in noxious emissions. All of these problems have inhibited development of efficient high temperature and pressure reciprocal engines that have short piston strokes and that operate at high r.p.m.

Several of the above mentioned problems in engine design have been solved by applicants in their prior patents entitled REGENERATIVE THERMAL ENGINE and HIGH PRESSURE RECIPROCATOR COMPONENTS referenced above. In addition, applicants have devised symmetrical piston configurations as described in U.S. Pat. No. 4,858,566, issued Aug. 22, 1989, entitled, AXIALLY SYMMETRICAL PISTON FOR RECIPROCAL ENGINES. The engine herein described utilizes certain of the techniques and features disclosed in these prior references and includes new features and improves both the components used and the manner of operating the engine, particularly a single cylinder, opposed piston engine.

In particular, applicants have devised a phase cycling of the opposed pistons in the single cylinder engine such that the effective cycle duration of the maximum compression period is prolonged to enable and insure complete mixing and combustion of the injected fuel. Furthermore, the combustion chamber includes a central, specially configured regional chamber for initial combustion that is designed to cooperate with the phased cycling of the pistons for maximizing the turbulence of the compressed air and injected fuel by a double, sequential squish action.

In addition, the piston construction has been designed to maximize both the dual wrist pin assembly and axially symmetrical piston head assembly by a unique combination of such assemblies to enable the piston to structurally and dynamically withstand the inordinately high pressures developed during the improved combustion process. To achieve these super-high combustion pressures, the engine is charged by a unique counterrotating turboblower that is connectable in one stage to the engine drive train and in a second stage to an exhaust turbine. The turboblower is designed to produce compressed air both at low idle speeds where the expanding exhaust gases are insufficient to drive a turbocompressor and at high engine speeds where the exhaust expansion provides for total drive of both compression stages for peak compression in the turboblower. Although the various components in the preferred engine design disclosed herein have independent merit, the preferred use of these features and components is in the improved engine assembly disclosed herein.

SUMMARY OF THE INVENTION

The improved high pressure, high temperature, high r.p.m. engine of this invention enhances engine performance by various features, components and operations that enable heretofore unachievable combustion pressures to be obtained in a combustion chamber of a reciprocal engine. Various mechanical, structural and operational limits have been placed upon the internal combustion engine using reciprocal pistons. Among these are the inability to efficiently develop highly compressed air for injection into the cylinder, incomplete mixture of the fuel and air during the injection process, assymetrical thermal and structural stresses in the piston, and insufficient time for complete combustion at peak compression. By the innovative combination and arrangement of components herein described and the operation of the assembly in the manner proposed, potential engine performance exceeds what has heretofore been considered to be the operational limits of the reciprocal internal combustion engine.

The performance objectives are achieved by a combination of improved features each of which has independent merit. First, the combustion chamber configuration is designed to produce a high pressure working volume. The construction of an opposed piston engine provides an unique opportunity to design a combustion chamber for initial combustion that differs substantially from the conventional piston and cylinder arrangement. When two pistons approach from opposite ends of a cylinder, the final compression volume for a particular engine stroke and compression ratio has twice the depth of the compression volume in an engine with one piston that compresses the gas volume in the same diameter cylinder against a stationary head. Coupled with an effective means for generating gas turbulence, the deeper volume of the combustion chamber for initial combustion permits improved fuel-air mixing and avoids some of the problems of thin flat chamber configurations that promote travelling flame fronts and uneven combustion.

By specially configuring a combustion chamber between the heads of the pistons at top dead center, high pressure working volumes that promote high intensity mixtures of air and fuel by multiple regional turbulence eddies enable burning of high quantities of fuel in a very short time. The design of chambers with multiple zones of regional turbulence results in a dispersed, multiple stratified charge formation and combustion with a reduction of all types of noxious emissions. Complete and efficient combustion of the fuel-air mixture is accomplished not only by the combustion chamber configuration but by the utilization of a high pressure, multiple nozzle, fuel injector system. The fuel injector system is sequentially controlled by an electronic micro processor programmed to optimize the injection at all loads utilizing sensed operating conditions such as r.p.m., supercharging level, emission control, engine speed, torque requirement, combustion temperature and pressure, and the nature of the environment in which the engine is operating. Additionally, the fuel injector system is designed to enable the use of different fuels in each injector according to the desire of the operator or the automatic control of the microprocessor.

The combustion chamber and fuel injection system are designed in the opposed piston engine with a central regional combustion chamber having an open bore that is preferably of non-circular configuration. The central combustion chamber is positioned between the opposed pistons at top dead center and includes a peripheral collar portion that has a flat face which coacts with each piston face to produce a high velocity squish action to force the air compressed between the faces toward the center bore where the injectors inject fuel for initiating combustion in a turbulent environment. The use of multiple fuel injectors not only improves the turbulence pattern created, but enables the injection process to be staggered for maximum effectiveness.

As a further unique design feature that is possible by use of the opposed piston arrangement is the cycle phase lag of one of the pistons to cause it to reach top dead center shortly after the first piston to achieve a double squish action to enhance the turbulence and to prolong the period of time during which the peak compression between the pistons occurs. This is particularly important where the engine is highly supercharged and the engine is of a short stroke type that operates at high r.p.m. The ability to prolong the period of peak compression enables greater control over the timing of the injection process and the duration of the burn in order to obtain a complete combustion of a high quantity of fuel injected into a small volume of highly compressed air.

The use of a central regional combustion chamber that is open at both ends to opposed pistons with a shifted cycle action allows the combustion to be initiated when one piston reaches top dead center and produces a pulse of air directed to the central chamber and, as the combustion process develops, completed with an additional pulse of air infused into the burning gases when the other piston reaches top dead center. This action provides a double mixing impulse of air, the first at the beginning of the combustion process and the second at the end of the combustion process when the combustion process needs the additional air charge to complete combustion of any unburn fuel in the initial burning process. This improved combustion chamber design and shifted piston operation maximizes the produced turbulence and extends the duration of the combustion process.

In association with the combustion chamber design and the multiple fuel injector system is a preferred high level supercharger that can develop air compression at two to twenty atmospheres depending on the engine operation. The unique supercharger is a combined blower and turbocharger in which air compression at low engine speeds is developed by a drive-train connected compressor rotor and at high speeds the compression is supplemented or assumed by a gas expansion turbine. The gas expansion turbine drives a second stage compressor rotor counter to a mechanically driven first stage for high pressure high volume delivery of air to the engine cylinder. Use of a counterrotating compressor that is driven in part mechanically by the engine and in part by the expanding exhaust gases in a single unit minimizes the lost power to drive the supercharger and maximizes the use of the expanding gases to increase the compression during the very time that the additional infusion of compressed air is needed for a generally larger charge of fuel during peak operations. While the engine configuration preferred can be utilized with the positive displacement, compound rotocompressor described in our referenced application entitled, REGENERATIVE THERMAL ENGINE, the novel counterrotating turboblower in part mechanically driven by the engine and in part gas driven has certain advantages in supplying adequate compressed air at all engine speeds.

In order to appropriately deliver work from the efficient and high pressure combustion gases to the drive train through expansion in the single cylinder, the pistons must be designed to withstand the high pressures and temperatures of combustion with minimal weight to reduce the inertial forces from high r.p.m. operation. To eliminate structural and thermal distortions of the piston head, the piston head is symmetrically constructed about its central axis and seated on a spherical bearing surface that interconnects dual rolling wrist pins of the dual connecting rod assembly with the axially symmetrical piston head. The unified construction of the piston minimizes both friction forces from distortions of the piston and side thrust normally resulting from conventionally configured connecting rod assemblies. This unique combination also maintains the axial symmetry of the piston head while maximizing the projected surface area interconnecting the piston with the connecting rod for maintenance of an oil film under extremely high thrust forces.

These and other features of the engine disclosed in this application will become apparent upon a consideration of the detailed description of the preferred embodiments described hereinafter.

BRIEF DESCRIPTION OF THE DRAWINGS

FIGS. 11.0-11.7 are schematic illustrations of alternate embodiments of the turboblower of FIG. 1.

DETAILED DESCRIPTION OF THE PREFERRED EMBODIMENTS

Figure 1:
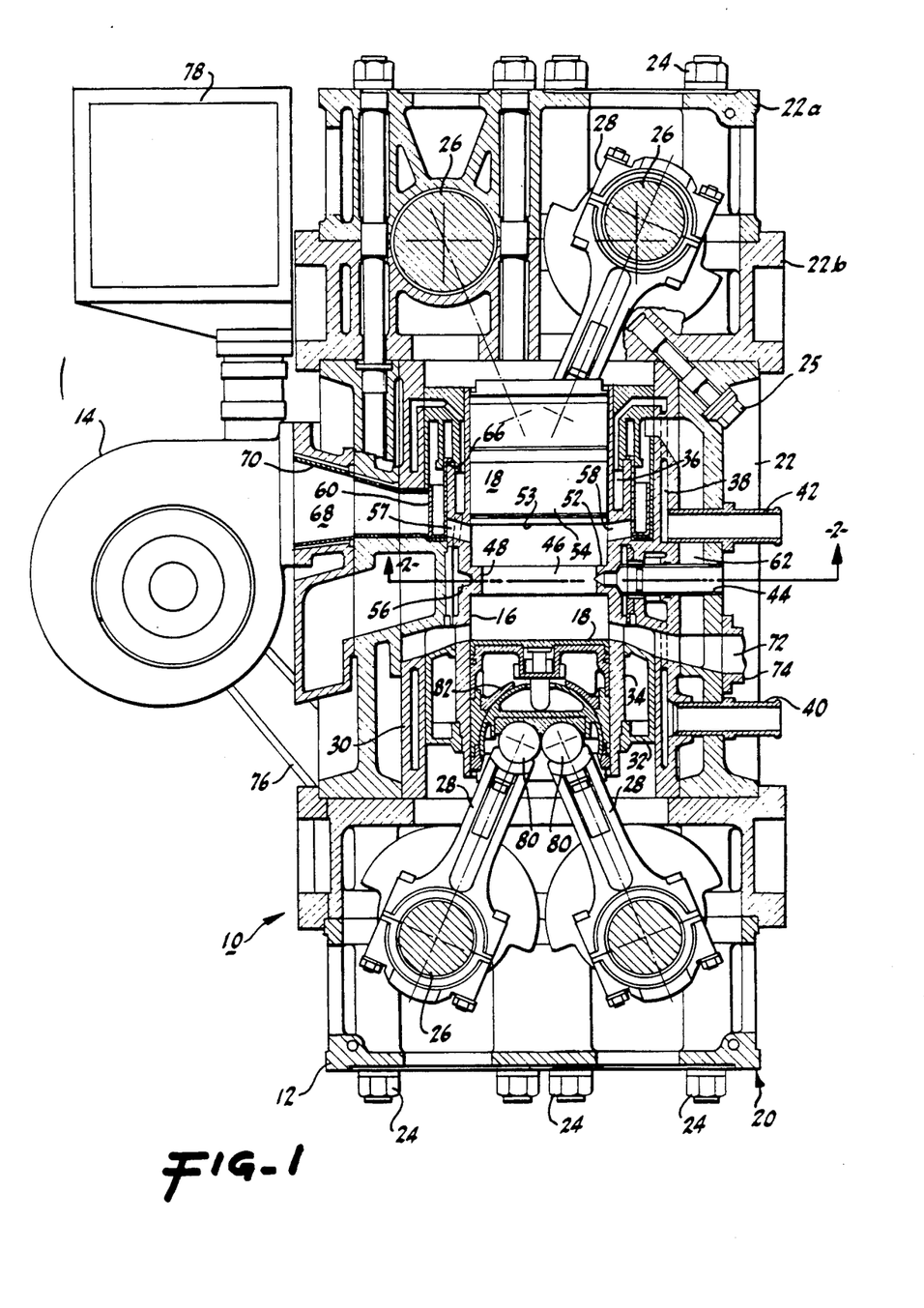
FIG. 1 is a cross sectional view of an opposed piston engine in combination with a two-stage counterrotating turboblower.

Referring to FIG. 1, the preferred engine assembly that incorporates all of the improved features is shown and designated generally by the reference numeral 10. The engine assembly includes a single cylinder opposed piston engine 12 in combination with a turboblower 14 for providing highly compressed air to the central working cylinder 16 in which opposed pistons 18 of the engine reciprocate. The engine 12 includes an engine block 20 that is comprised of several external casting sections 22 a, b and c held in compression by a series of elongated through bolts 24. Diagonal bolts 25 (one shown) lock the casting sections together. The casting sections hold separate crank shafts 26 for each of the dual connecting rods 28 for each piston 18. The dual connecting rods rotate the crank shafts associated with each piston in an opposite rotational direction. In this manner, the side thrust forces on the piston are cancelled and the piston is able to reciprocate in the cylinder with minimum friction against the walls of the cylinder. The output from the separate crankshafts may be connected to independent drive trains (not shown) or may be combined by a gear box for a single output drive.

Within the center casting section 22a of the block 20 is a cylindrical cooling housing 30 for a liquid coolant which may be water, oil or preferably a liquid fuel used to power the engine. The cooling housing 30 contains the cylindrical support structure 32 for the combustion chamber cylinder sleeve 34. Portions of the cylinder sleeve 34 include cooling passages 36 that are part of a cooling conduit system 38 that passes through the cooling housing 30 and has an inlet and outlet connection 40, and 42 respectively. The conduit connections are coupled to the coolant supply (not shown). In the preferred arrangement, the coolant is a fuel and the heated fuel after circulating through the cooling system is supplied to one or more of the fuel injectors 44 arranged around a central regional combustion chamber 46 located between the two pistons 18 when positioned at top dead center in the engine cylinder 16. As shown in the cross section of FIG. 1 the central regional combustion chamber has a bore 48 that is less than the bore of the engine cylinder 16.

Figure 2:
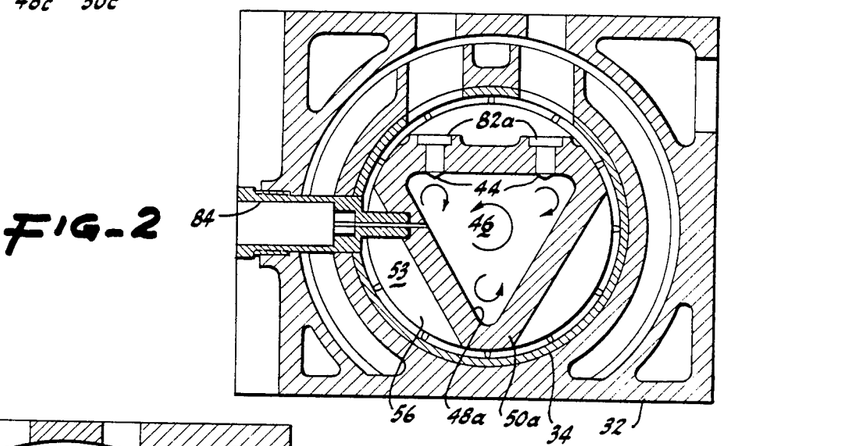
FIG. 2 is a cross sectional view of the central regional combustion chamber taken on the lines 2—2 in FIG. 1
Figure 3:
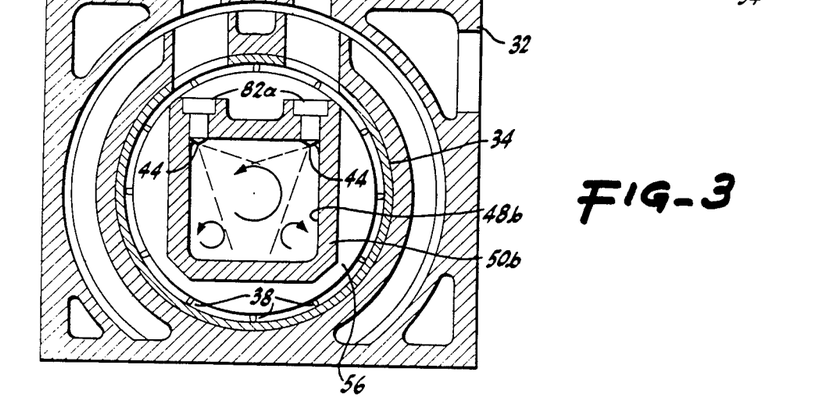
FIG. 3 is a first alternate embodiment of the central regional combustion chamber of FIG. 2.
Figure 4:
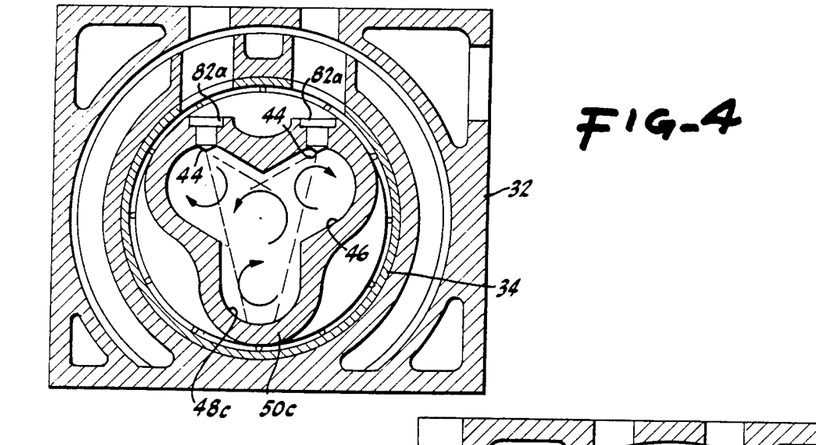
FIG. 4 is a second alternate embodiment of the central regional combustion chamber of FIG. 2.

As shown in the embodiments of FIGS. 2, 3 and 4 the bore is preferably not circular but of a geometric configuration that improves the turbulence in the central chamber 46. The configured collar 50 forming the bore 48 has flat side faces 52 facing the flat faces 53 of the piston head 54 to produce a squish of the captured air in the cylinder between the faces as the pistons approach the top dead center. The tolerance between the side faces 52 of the configured collar and the faces 53 of piston heads 54 are minimized with consideration to avoiding contact of the piston head with the configured collar. The construction of the configured collar portion of the cylinder sleeve 34 is discussed in greater detail with reference to FIGS. 2-4.

As shown in FIG. 1 the cylinder sleeve 34 at the configured collar 50 forming the constricted bore 48 has a hollow chamber 56 for flow of coolant. As illustrated in dotted line the coolant flows from the hollow chamber 56 through the ribs or bridges 57 between the exhaust ports 58 to the coolant conduit system 38. The circulating coolant cools the engine hot spots and for fuel coolants returns the extracted thermal energy into the system when injecting the preheated fuel into the engine.

The exhaust ports 58 are exposed when the pistons are retracted as shown but are regulated in size by a floating sleeve valve 60 biased in one direction by compressed air from an air supply conduit 62 for intake ports 64 and activated in the opposite direction by hydraulic fluid in a hydraulic fluid chamber 66 shown in its minimal volume condition in FIG. 1. The sleeve valve 60 prevents over-scavenging of the cylinder and regulates the size of the exhaust ports for optimum efficiency under different operating conditions. The exhaust gases expand through an exhaust passage 68 protected by a thermal shield 70 to the turboblower 14 where they drive the turboblower as described in greater detail hereafter.

Highly compressed air from the turboblower 14 is supplied to the intake passages 72 through a conduit 74 shown only in part in FIG. 1. The turboblower 14 is described in greater detail in various configurations with reference to FIGS. 11.0-11.7. The turboblower 14 is in part driven by the exhaust gases from the engine through exhaust passage 68 and in part is directly driven by a gear mechanism or drive belt 76 connected to one of the crank shafts 76 to provide compressed air during low operating speeds of the engine where the exhaust gases are insufficient to drive the compressor to the degree necessary to supply air for the lean mixtures desired. The turboblower may include a clutch between the mechanical drive connection with the crankshaft 76, as hereinafter described, to allow the exhaust gases to power both stages of the counter rotating compressor when possible. The turboblower 14 is coupled to an intercooler 78 which circulates ambient air over the compressor and compressed air discharge of the turboblower to cool the air to improve the density as it enters the engine.

As shown in the cross section of one of the pistons 18 the piston is connected to dual connecting rods 28 by rolling wrist pins 80 which are seated in a piston body 82 having a unique internal structure that is described in greater detail hereafter. The advantages of utilizing the rolling wristpins 80, enable not only cancellation of side thrust forces of the conventional crank assembly, but double the projected surface area that provides the thrust bearing surface between the piston and the connecting rod. The construction of the piston is described in greater detail hereinafter with reference to FIGS. 7-10.

The engine assembly 10 of FIG. 1 illustrates the integration of the components and operational features described in this specification into a compact, high-powered and light-weight engine that minimizes the undesirable products of both incomplete and excessively high temperature combustion.

Referring now to the alternate embodiments of the central regional combustion chamber shown in FIGS. 2-4, a central support structure 32 of simplified design contains and supports the cylinder sleeve 34 with three unique configurations of a central bore, 48a, 48b and 48c. Referring in particular to FIG. 2 the central bore 48a is triangular in configuration and has two parallel injector sockets 82 on one face of the triangular shaped bore. In the embodiment of FIG. 2, the hollow cooling chamber 56 is formed by walls having flat outer side faces (not visible). The outer side faces 52, shown in FIG. 1 coact with the flat face 53 of the piston head 54 visible through the triangular opening in the configured collar 50a in FIG. 2 to provide for discontinous squish of air from three different directions that converge on the center to create a central turbulence with corner eddy currents within the central regional combustion chamber 46. While the configuration of the bore 48 forming the central regional chamber 46 can be circular and concentric with the engine cylinder 16, this arrangement would provide for a uniform, radially inward flow of compressed air during squish that is less condusive to a highly turbulent condition for thorough mixing of the compressed air with the injected fuel. As the intake ports 64 each have an opening that is tangentially arranged in a conventional manner to create an axial swirl of the charging air, the non-circular configuration of the configured collar 50a is preferred to induce greater turbulence of the finally compressed charge of air within the confines of the central regional combustion chamber 46 at the time of fuel injection. For clarity, only the tips of the fuel injectors 44 are shown in FIGS. 2–4. The embodiment of the central regional combustion chamber of FIG. 2 includes a chamber probe component 84 in communication with the central chamber 46. This probe component 84 may alternately comprise a sensor probe to monitor the temperature and pressure of combustion in the central combustion chamber or an injection probe for injecting auxiliary fluids such as water for cooling and increasing the power of the engine. The auxiliary component 84 is omitted from the other embodiments of the configured central combustion chamber and it is to be understood such embodiment may include such a probe component if desired.

Since the periodic air charge enters the engine cylinder from one side of the constricted bore and scavenges combustion gases in the cylinder through the bore 48a and out the exhaust ports 58 at the other side, the cross sectional area of the bore 48a must be appropriately sized to maximize the effectiveness of squish yet minimize the impedance of the air flow through the central collar constriction in the engine cylinder. The ratio of the combustion chamber triangular bore area to the cylinder bore area, is less than one, but is always greater than the ratio of the intake ports area to the cylinder bore area, which in turn is always greater than the ratio of exhaust ports area to the cylinder bore area. The ratio of the combustion chamber bore area to the cylinder bore area, defines the double squish ratio and the relationship of the central constriction area between the intake and exhaust sides of the engine cylinder.

The relationship of the cross sectional area of the triangular bore with the cylinder bore and the intake ports and exhaust ports is as follows:

$$A\ T/B = \frac{\text{Triangular bore area}}{\text{cylinder bore area}} < 1$$

$$A\ I/B = \frac{\text{Intake ports area}}{\text{cylinder bore area}} < A\ T/B$$

$$A\ E/B = \frac{\text{Exhaust ports area}}{\text{cylinder bore area}} < A\ T/B$$

$$A\ I/B > A\ E/B$$

Referring now to FIG. 3 the support structure 32 supports a cylinder sleeve 34 having a configured rim 50b which forms a central bore 48b that is essentially square in cross sectional area. Injector sockets 82 are arranged in the corners of the central bore 48b with projecting nozzles 44 that have an off-center spray as shown in dotted line. Again, the non-circular configuration of the central bore induces both a central turbulence swirl of gases as well as corner eddie currents. In the hollow chamber 56 are shown a cooling conduit system 38 which pass through the bridges 57 between the exhaust ports 58 in FIG. 1. Again, as stated with respect to the triangular bore, the relationship of the cross sectional area of the square bore with the cylinder bore and the intake ports and exhaust ports are as follows:

$$A\ S/B = \frac{\text{Square bore area}}{\text{cylinder bore area}} < 1$$

$$A\ I/B = \frac{\text{Intake ports area}}{\text{cylinder bore area}} < A\ S/B$$

$$A\ E/B = \frac{\text{Exhaust ports area}}{\text{cylinder bore area}} < A\ S/B$$

$$A\ I/B > A\ E/B$$

In FIG. 4 a similar support structure 32 supports a cylinder sleeve 34 having a configured collar 50c forming a clover-shaped bore 48c. Parallel injector sockets 82 are positioned as shown in two of the lobes of the clover-shaped bore 48c and direct spray from injector nozzles, which the ends are shown 44 with a spray pattern as shown in dotted line. Again, the swirl of the incoming air and the squish action of the opposed pistons create a substantial turbulence in the central regional combustion chamber 46 resulting in a central turbulence and perimeter currents for complete mixture of the compressed air and injected fuel.

The ratio of the combustion chamber, clover-shaped bore area to the cylinder bore area defines the double squish ratio and the relationship with the central constriction area between the intake and exhaust sides of the engine cylinder. The relationship of the a cross sectional area of the clover-shaped bore with the cylinder bore and the intake ports and exhaust ports is again as follows:

$$A\ C/B = \frac{\text{Clover-shaped bore area}}{\text{cylinder bore area}} < 1$$

$$A\ I/B = \frac{\text{Intake ports area}}{\text{cylinder bore area}} < A\ C/B$$

$$A\ E/B = \frac{\text{Exhaust ports area}}{\text{cylinder bore area}} < A\ C/B$$

$$A\ I/B > A\ E/B$$

In common with all of the geometric shapes including the less desirable circular shape of the central bore is the general ratio between the cross sectional area of the bore of the central regional combustion chamber and the cross sectional area of the cylinder bore. This general relationship is as follows:

$$A\ R/B = \frac{\text{Regional chamber bore area}}{\text{cylinder bore area}} < 1$$

$$A\ I/B = \frac{\text{Intake ports area}}{\text{cylinder bore area}} < A\ R/B$$

$$A\ E/B = \frac{\text{Exhaust ports area}}{\text{cylinder bore area}} < A\ R/B$$

-continued $$A\ I/B > A\ E/B$$

Figure 5:
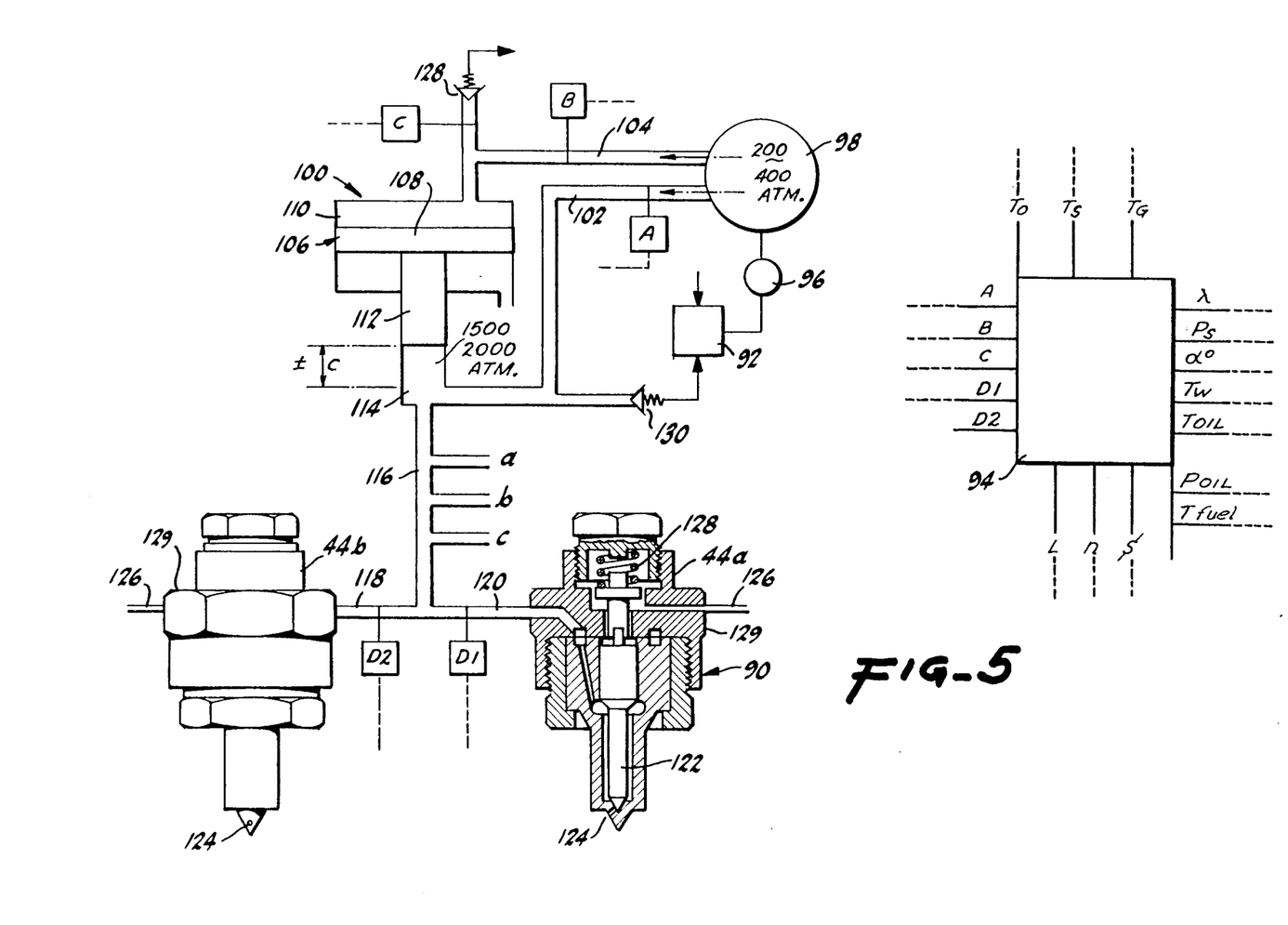
FIG. 5 is a schematic illustration of the fuel injector system with multiple fuel injectors.

Referring now to the schematic illustration in FIG. 5, the multiple fuel injectors that are arranged around the combustion chamber 46 are supplied with fuel in a preferred sequential manner. In the fuel injector system 90 shown in FIG. 5, two injectors 44a and 44b supply the necessary fuel from a single fuel source 92 to the central regional combustion chamber 46 (not shown) in accordance with the control of a microprocessor 94. The fuel source 92 has a pump 96 to pump the fuel to a reservoir 98 which is maintained at a pressure of 200–400 atm. The reservoir 98 is connected to a pressure amplifier 100 by branches 102 and 104 controlled by electronic control valves, A and B respectively. The pressure amplifier 100 has a piston 106 with a large area piston head 108 in a chamber 110 and a small area piston head 112 in a chamber 114. Upon opening of electronic valve B the fluid from the reservoir 98 displaces the piston 106 compressing fluid in the chamber 114 to a pressure of 1500–2000 atm. Fluid under this pressure is transmitted to the fuel injectors 44a and 44b through line 116 which branches to lines 118 and 120 protected by electronic control valves D1 and D2. Upon actuation of the electronic valves, D1 and D2 fluid enters the injectors and lifts the spring loaded plunger 122 protecting the nozzle orifice 124, thereby allowing fuel to spray from the end of the nozzle. Feedlines 126 assist the plunger spring 128 in the nozzle housing 130 to maintain the plunger 122 in sealed engagement with the end of the injector nozzle to prevent leakage from the nozzle. Any leakage of the high pressure fluid post plunger 122 is returned by medium pressure feed line 126.

When electronic valve C is opened and electronic valve B is closed, the pressure in the low pressure chamber 110 is immediately relieved with any fluid returning through the pressure relief valve 128 to the fuel source 92. This relief immediately reduces the pressure in the high pressure chamber 114 and upon opening electronic valve A the piston 106 is returned to a prepulse position. A high pressure relief valve 130 insures that the desired maximum pressure of 1500–2000 atm for injection is not exceeded.

Figure 6A:
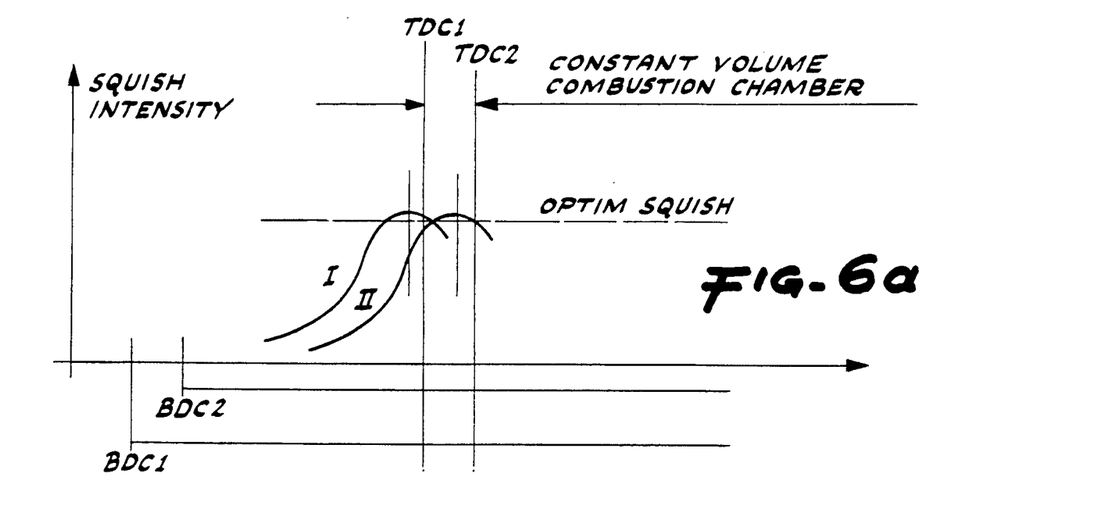
FIG. 6a–6b and 6c are schematic illustrations of the operating regime of the fuel injectors with the cycling of the pistons.
Figure 6B:
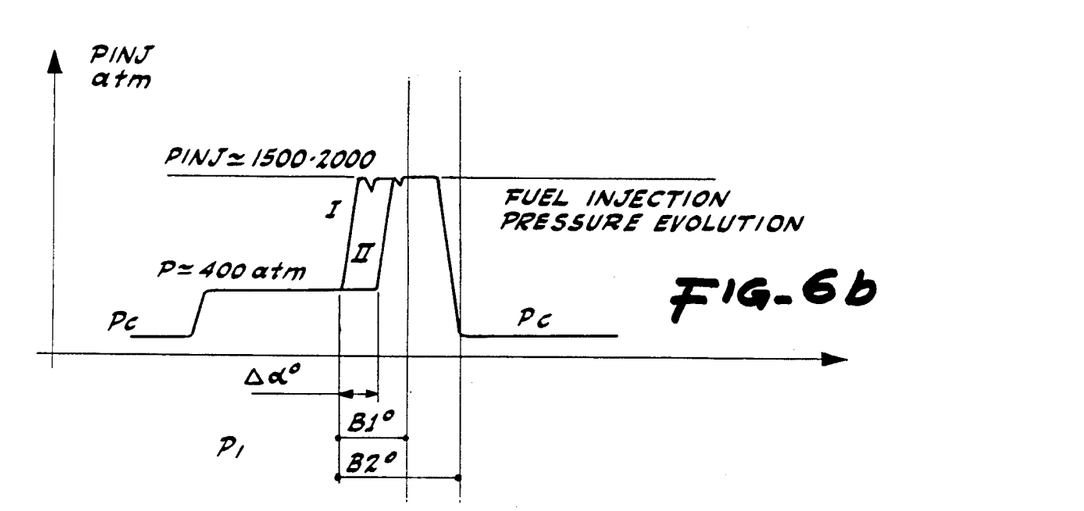
Figure 6C:
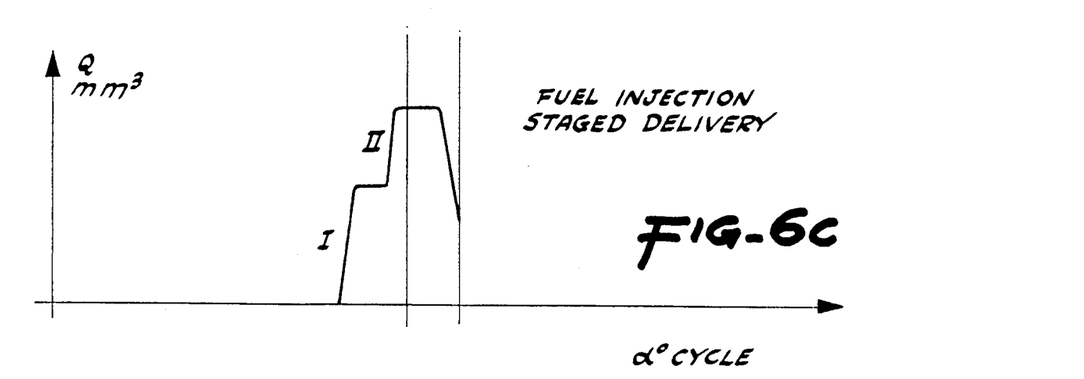

The control of the electronic valves A,B,C, D1 and D2 are automatically regulated by the microprocessor 94 in accordance with the operational demands and the environmental conditions sensed during operation of the engine. In advance state of the art engines multiple sensors are used to sense the following conditions which are used as inputs to the microprocessor 94:
TG = EXHAUST TEMPERATURE
TS = AIR TEMPERATURE (SUPERCHARGED)
TO = AMBIENT AIR TEMPERATURE
L = LOAD (TORQUE)
N = RPM
S = SPEED (VEHICLE)
λ = EXCESS OF AIR
PS = SUPERCHARGING PRESSURE
$a^o$ = CRANK ANGLE
$T_W$ = WATER TEMPERATURE
Toil = OIL TEMPERATURE
Poil = OIL PRESSURE
Tfuel FUEL TEMPERATURE Referring in addition to FIG. 6, the preferred operation of the two fuel injectors 44a and 44b is shown with respect to the preferred embodiments herein. The operation of the fuel injectors is sequential to provide a pulsed fuel delivery that is coordinated with the double squish action of the opposed pistons. In FIG. 6a–6c the point in the engine cycle in which the pistons reach top dead center are labeled as, TDC1 and TDC2. Since the squish action begins prior to each piston reaching the top dead center as the flat face of the piston approaches the flat face of the constriction collar forming the regional combustion chamber, the squish curve is traced along the lines designated as I and II in FIG. 6a. As previously noted, the operation of the pistons in a phase shifted manner effectively extends the time of peak compression and the duration in which full mixture of the fuel and air can be accomplished Since fuel is preferably injected prior to the piston reaching its top dead center, the injection process for each cycle is depicted in FIG. 6b as coordinated with the squish intensity which provides the turbulence pulse for complete mixing. As shown, the pressure curves are limited by the maximum pressure permitted by the relief valve. During the cycle the first injector labeled I initiates injection at an angle of B° in advance of top dead center of the first piston and at a subsequent angle, the second injector initiates injection with both injectors completing air injection process just prior to the second piston reaching its top dead center at TDC2. The summation of the fuel injection from the two injectors is shown in FIG. 6c. By coordinating the staged injection process with the double squish action of the pistons, an inordinately large quantity of fuel can be injected into the highly compressed air within the confines of the central regional combustion chamber and achieve the necessary mixing and burning to complete combustion during the expanded period of peak compression. With the period of peak compression spread over a greater angular portion of the cycle of operation of the dual piston engine a greater period is provided to control the injection process, the mixing process and the burning process.

Variations in the staged operation of the fuel injectors may be controlled by regulating the timing of the activation of electronic valves D1 and D2 and additionally by variations in the size of the two nozzle orifices 124. Different nozzle sizes may be advantageous where one nozzle is sized to deliver a fine spray of fuel and the other is sized to deliver a high volume of fuel. Select actuation of the valves can be accomplished by the microprocessor in coordination with engine operating conditions, environmental conditions and operator demands. While all of the parameters of the engine are optimized under control of the microprocessor one of the primary factors for optimization is the control of the emission as sensed by the λ sensor situated in the exhaust pipe, which monitors exhaust composition. The microprocessor continually correlates the optimum air/fuel ratio for the desired lean mixtures to assure complete combustion without over scavenging f the engine cylinder by the highly compressed air.

The injection process shown in FIG. 6b which correlates the pressures from the low pressure storage level of 5 to 10 atm. to the reservoir level of 400 atm. and the final injection level of 1500–2000 atm. corresponds with the preferred arrangement of the fuel supply system shown in FIG. 5. However, it is to be understood that additional injectors can be included fuel line at branches labelled a, b and c in FIG. 5 and that an auxiliary system can be incorporated that delivers an alternate fuel to one or more of the injectors. Although the design of the combustion chamber and the phase shifted operation of the opposed pistons can be applied to conventional opposed piston engines, these features are particularly adapted for substantially increasing the combustion pressures in the combustion chamber. It is therefore preferred that the opposed piston engine utilize the dual connecting rod assembly shown in FIG. 1. In using this assembly, an improved design of a light weight piston 18 is provided.

Figure 7:
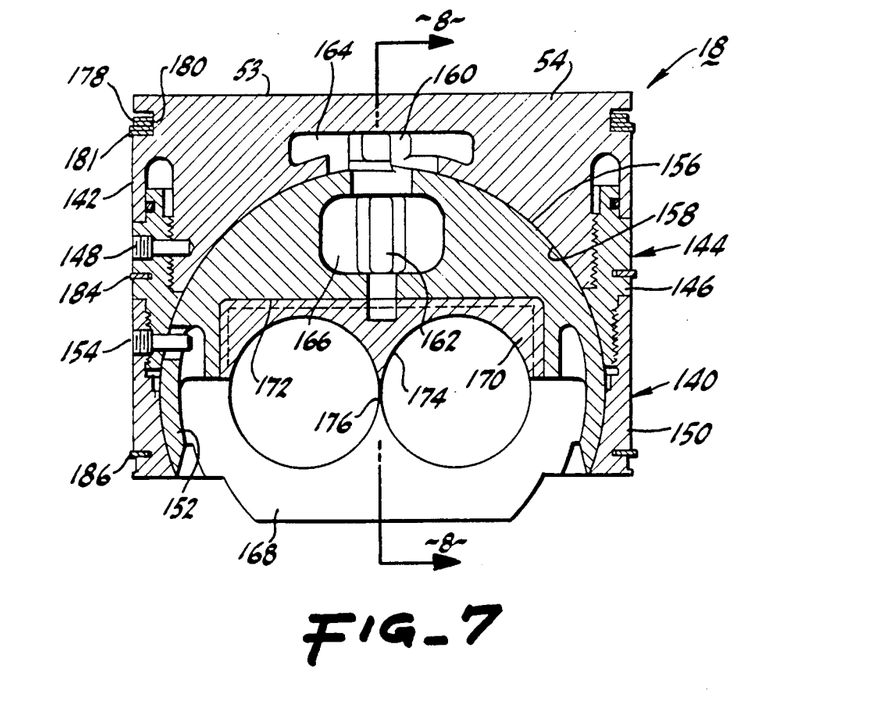
FIG. 7 is a cross-sectional view of an alternate embodiment of a piston for the opposed piston engine of FIG. 1.
Figure 8:
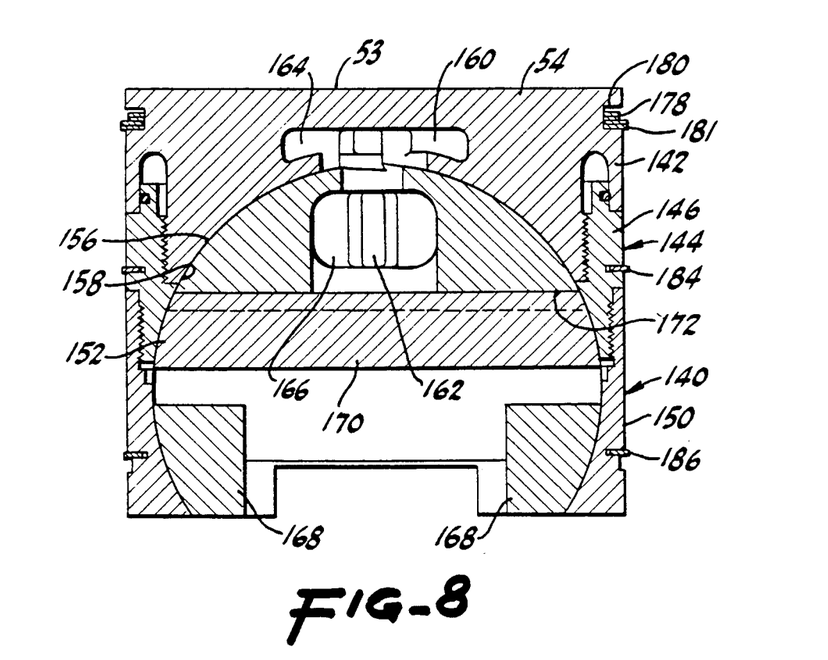
FIG. 8 is a cross-sectional view of the piston of FIG. 7 taken on the lines 8—8 in FIG. 7.

Referring to FIGS. 7 and 8, the assembly 140 of the piston 18 shown therein is constructed with a piston head 54 with a flat top face 53 with a side skirt 142 that is coupled to a two part middle and lower skirt assembly 144. The two part assembly 144 has a middle skirt 146 threaded to the skirt 142 of the piston 54 and retained from rotation by a set screw 148. The middle skirt 146 is similarly threaded to a closing skirt 150 that captures a spherical bearing structure 152. A set screw 154 connects the middle skirt and closing skirt, but does not lock the spherical bearing structure 152 to the head and skirt assembly. The head and skirt assembly is permitted limited articulation on the spherical bearing structure. The particular skirt devised allows the head and skirt assembly to be axially symmetrical such that all thermal and structural deformations are radially uniform. Between the spherical surface 156 of the bearing structure 152 and the inside spherical surface 158 of the head is a thin oil film produced by constantly circulating oil that is contained in the shaker chamber 160 of the head and a similar communicating chamber 162 in the bearing structure 152. The chambers have radial vanes 164 and 166 to expand the size of the chambers without sacrificing the structural integrity of the components to permit the oil to cool as well as lubricate the piston head and bearing structure.

The bearing structure 152 has integral bridge sections 168 on which the ends of the rolling wrist pins 80 seat when installed in the piston 18. A special bearing surface inset 170 seats in a recess 172 in the bearing structure 152. The top of inset 170 includes an oil trough that distributes oil from the oil chamber 162 in the bearing structure to the spherical bearing surface between the bearing structure and head. The inset 170 provides the contact thrust 174 between the piston and the wrist pins. The wrist pins are in direct contact with one another having a rolling interface 176 that absorbs side thrust forces during connecting rod articulation thereby eliminating canting of the piston as it reciprocates in the cylinder. The direct contact action between the wrist pins additionally squeezes oil onto the thrust surface 174 thereby improving lubrication of the interface. The projected area of the thrust surface 174 is approximately twice that produced by a conventional single pin connection between a piston and a single connecting rod. This expanded surface area reduces the force per unit area and allows maintenance of an oil film even under extreme pressure conditions.

Figure 9:
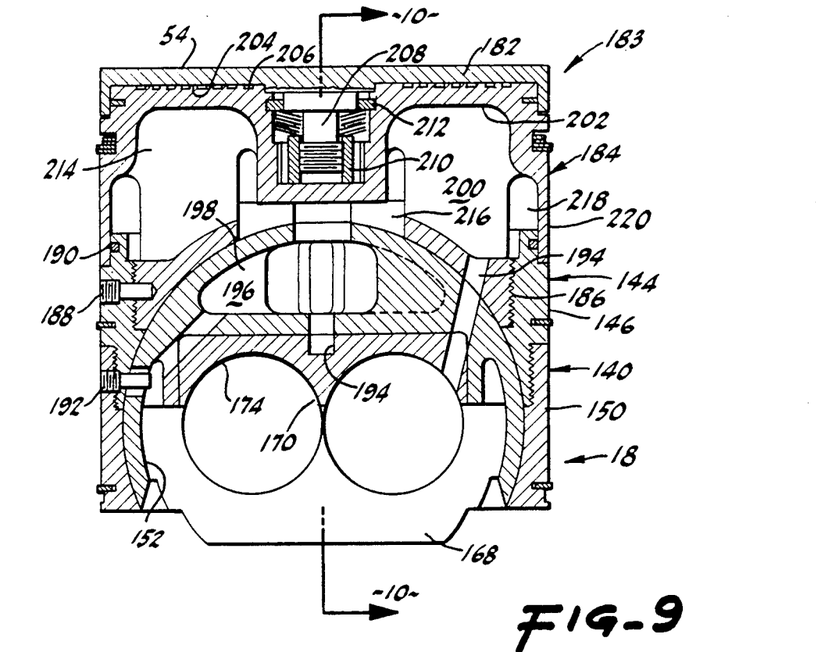
FIG. 9 is a cross-sectional view of the piston of FIG. 1.
Figure 10:
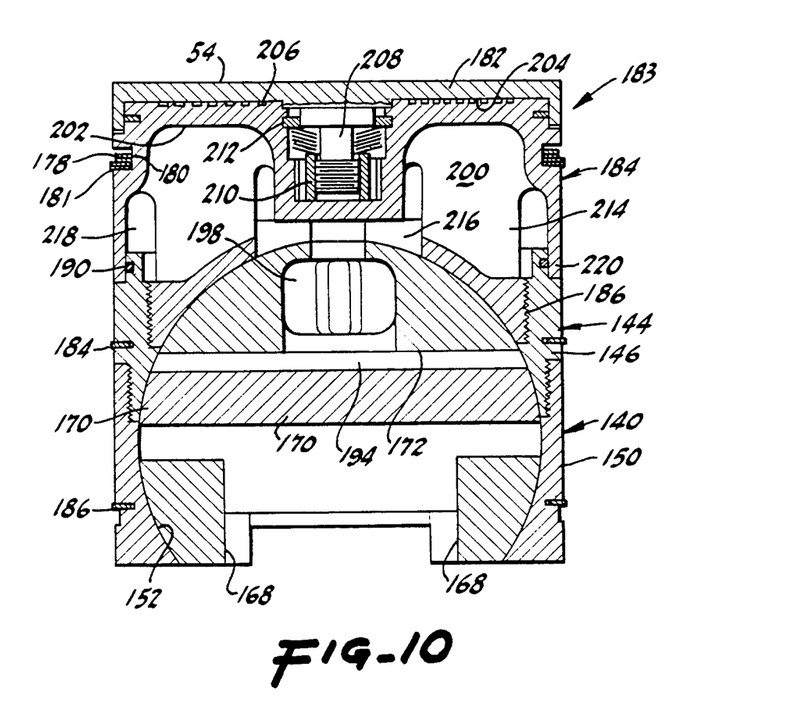
FIG. 10 is a cross-sectional view of the piston of FIG. 9 taken on the lines 10—10 in FIG. 9.

The piston 18 is sealed by a series of piston rings including a pair of contracting upper rings 178 which seals the back of the piston groove 180 and a pair of expanding lower rings 182 which contact the wall of the cylinder where the force of contact is controlled by the spring constant of the rings and not the pressure of the combustion chamber. The preferred rings are described in the referenced patent, HIGH PRESSURE RECIPROCATOR COMPONENTS. Additionally, the piston has an upper and lower oil rings 184 and 186 to complete sealing and track oil on the wall of the cylinder.

Where it is desirable to operate the engine at high supercharging levels which develop high temperature and pressure gases in the combustion chamber, the piston 18 can have a piston assembly 180 as shown in FIGS. 9 and 10 that includes a hot top cap 182. The hot top cap can be fabricated from a ceramic or special alloy material that can withstand high engine temperatures. The hot top cap 182 is again axially symmetrical in configuration such that any structural or thermal deformations are uniform and radial to minimize any adverse effects on reciprocation in the engine.

The piston assembly 180 has many components in common with the piston assembly 140 of FIGS. 8 and 9 and includes a skirt assembly 144 that couples to a hollow head 184 assembly by circumferential threading 186 with the assemblies fixed from rotation by a set screw 188 and sealed by a seal 190. The skirt assembly 144 includes a middle skirt 146 and a closing skirt 150 that is connected to the middle skirt by threading and retained from rotation by a set screw 192. The head assembly 184 and the skirt assembly 144 contain a spherical bearing structure 152 that houses a bearing surface inset 170 in a recess 172 and provides a thrust surface 174 for the dual rolling wrist pins 80 of FIG. 1. The assembly is essentially identical to that of FIGS. 8 and 9 with the inclusion of an oil channel 194 and an enlarged chamber 196 with support ribs 198 for containing cooling oil that is splashed by shaker action as the piston reciprocates. Oil splashes between the bearing structure reservoir 198 to a similar open reservoir 200 in the head assembly.

The head assembly 184 includes a hollow head unit 202 with a flat top surface 204 with a spiral air groove 206 between the underside of the top cap 182 and the top surface 204 of the head unit 202. This spiral air gap assists in insulating the combustion chamber from the structure of the head assembly to minimize any thermal deformations. To maintain the axial symmetry of the piston head assembly, the hot top cap 182 is secured to the head unit 202 by a threaded boss 208 that is connected to a nut 210 which compresses a spring against a split ring retainer 212. The open chamber 200 in the head unit 202, has structural support ribs 214 to maintain the structural integrity of the unit. An open passage 216 allows splash oil to flow between the head chamber 200 and the bearing structure chamber 196. Additional passages 218 between the ribs 214 and the side skirts 220 of the head unit allow oil to cool the outer circumferential surface of the piston which reciprocates proximate the portion of the engine cylinder wall that is in periodic contact with combustion gases when the pistons are retracted.

The head unit 202 is designed to float an oil film between the head unit and the bearing structure such that the thrust forces in the piston are distributed over the entire spherical surface of the bearing structure. This isotropical or uniform distribution of the thrust forces maintains the axial symmetry of the head assembly. Furthermore, the enlarged thrust surface 174 of the dual wrist pin inset 170 allows for a very high loading capacity of the piston by distribution of the forces over a greater projected area. The stratified construction of the piston body eliminates the requirement of tight tolerances in the counterrotating mechanism of the connecting rod assembly. In effect, the piston can be designed with minimal clearance in the cylinder with any minor adjustment during reciprocation being absorbed by both the interface between the head unit and the spherical support structure, and, the wrist pin inset and the wrist pins. As side thrust on the piston heads are eliminated by the rolling wrist pin configuration, the piston head can self-adjust for displacements with minimal friction.

Referring now to FIGS. 11.0-11.7, various configurations of the turboblower 14 having counterrotating stages of compression are shown. Common to each of the embodiments is a compressor having two stages of compression with one connected or connectable to the drive train of the engine and another stage which is a free wheeling stage that is coupled to a turbine rotor driven by combustion gases to rotate the other stage in counterrotation to the mechanically driven stage. It has been found that high compression can be achieved by moderate speeds of rotation in a compressor with rotors rotating in opposite directions. Since combustion gas pressures and volumes are generally insufficient to drive a compressor at low engine operating speeds and during startup, the engine requires an auxiliary compressor or blower that is connected directly to the engine drive train. In the embodiment of this invention a two stage compressor with counterrotating rotors has one stage connected to the engine and at least the second stage driven by the combustion gases. In this manner adequate compression can be provided solely by mechanical drive and supplemented by the gas drive.

Figure 110:
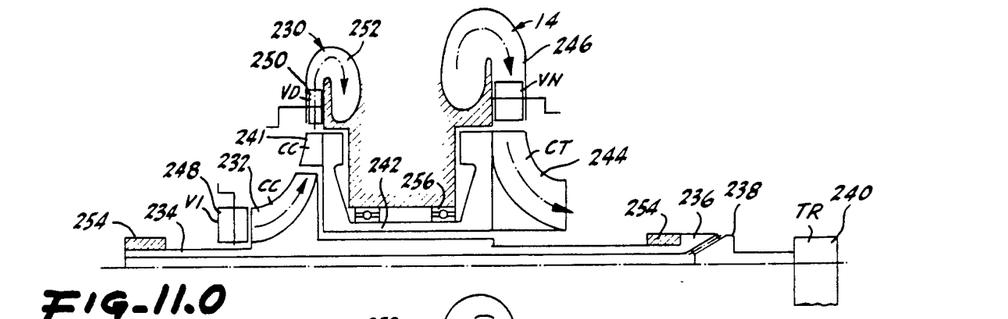

In its most basic configuration as shown in FIG. 11.0, blower assembly 230 includes a first stage centrifugal compressor rotor 232 connected to a rotor shaft 234 that has a bevelled gear 236 connected to a bevelled gear 238 of a transmission 240 that is connected to the engine drive train. The turboblower also has a second stage centrifugal compressor rotor 241 connected to a free wheeling shaft 242 that is coupled to a single stage turbine rotor 244. The turbine rotor 244 communicates with the engine exhaust via manifold 246 such that when sufficient gases are generated by the engine the turbine rotor 244 is driven to supplement the compression by the mechanically connected first stage compression rotor 232. The vanes of the turbine rotor 244 are designed such that the rotor rotates the connected shaft 242 in a direction opposite the shaft 234 of the first stage compression rotor 232 to enhance the compression effect. To provide some control on the degree of compression by the two stage compressor, the compressor side of the assembly is equipped with a variable intake 248 and a variable diffuser 250 that discharges the compressed air into an engine intake via manifold 252 leading to the cylinder intake ports for scavenging and charging the engine cylinder. Bearings 254 and 256 allow for counterrotation of the central shaft 234 and the concentric hollow outer shaft 242.

In the embodiment of FIG. 11.0, the first compressor stage is continuously connected to the engine drive train. However, where high compression engines are operated at higher speeds, sufficient exhaust gases are generated to drive not only the free wheeling rotor of the compressor, but to drive the rotor of the compressor that is normally connected to the engine drive train. In such a situation it may be desirable to maintain the connection between the first stage compressor and the engine drive train such that the power extracted from the expanding exhaust gases not only overcomes the mechanical power drain from the connection of the first stage compressor to the drive train but can provide a positive drive input to the drive train through this connection. Alternately, it may be desirable to disconnect the first stage compressor from the drive train once the expanding exhaust gases are capable of assuming the entire burden of driving both stages of the compressor and allow the turboblower to preform as a counterrotating turbocharger. Therefore in the variations of the counterrotating turboblower schematically shown in FIGS. 11.1-11.7 the turboblower is equipped with first and second rotors for compression and first and second rotors for expansion with an optional clutch mechanism for selectively engaging or disengaging one of the compressor rotors from a mechanical connection with the engine drive train. In the description of these embodiments the following conventional notations are applied to each of the FIGS.

LEGEND:
CC=CENTRIFUGAL COMPRESSOR
CT=CENTRIPETAL TURBINE
VI=VARIABLE INTAKE
VD=VARIABLE DIFFUSER
VN=VARIABLE NOZZLE
DC=DIAGONAL COMPRESSOR
DT=DIAGONAL TURBINE
AC=AXIAL COMPRESSOR
AT=AXIAL TURBINE
TR=TRANSMISSION COMPOUND
CL=CLUTCH
IC=INTERCOOLER

Figure 111:
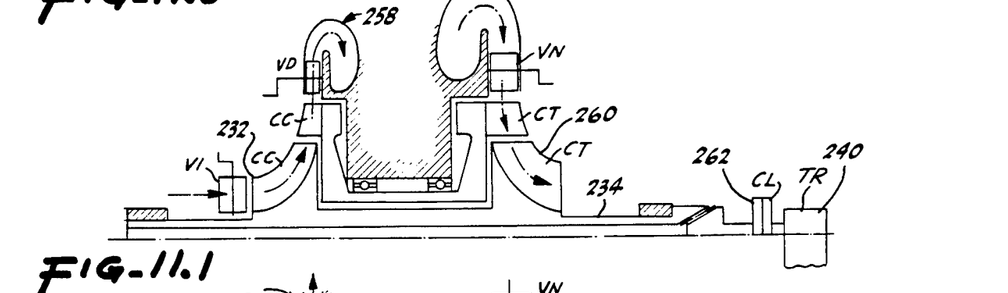

Referring to the turboblower assembly 258 of FIG. 11.1, the assembly is constructed essentially the same as the turboblower assembly 230 of FIG. 11.0 with the addition of a second stage turbine rotor 260 connected to the rotor shaft 234 which connects the first stage compressor rotor 232 to the drive train transmission 240 through a clutch 262. The clutch enables the turboblower to be disconnected from the drive train when exhaust gases are sufficient to power the turboblower and provide the necessary air compression required.

Figure 112:
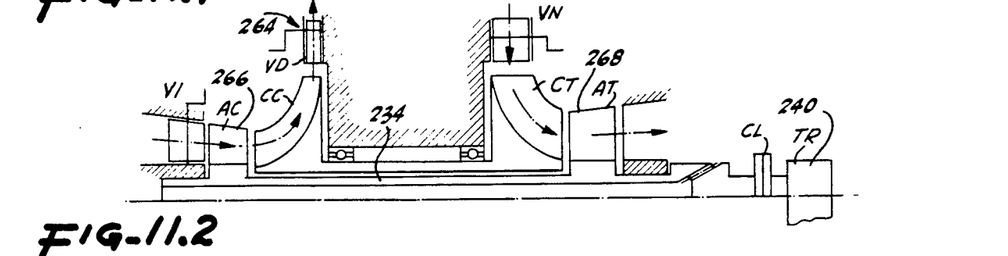

In the embodiment of FIG. 11.2 the turboblower assembly is constructed similar to the turboblower assembly 258 of FIG. 11.1 with the first stage centrifugal compressor rotor 232 replaced by an axial compressor rotor 266 and the second stage centripetal turbine rotor 260 replaced by an axial turbine rotor 268. The axial compressor rotor and the axial turbine rotor are connected to the common shaft 234 connectable to drive train transmission 240.

Figure 113:
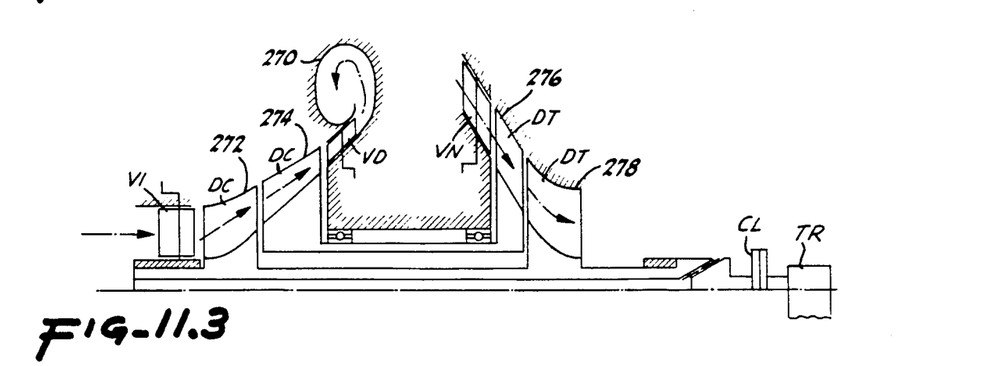

In the embodiment of the turboblower assembly 270 of FIG. 11.3 the centrifugal compressor rotors and the centripetal turbine rotors are replaced by first and second stage diagonal compressor rotors 272 and 274 and first and second stage diagonal turbine rotors 276 and 278.

Figure 114:
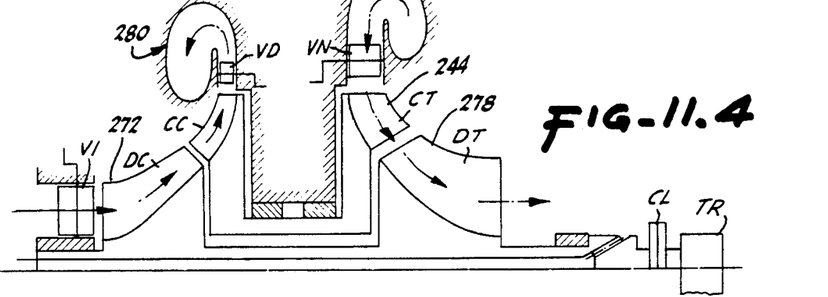

In the embodiment of the turboblower assembly 280 of FIG. 11.4 a first stage diagonal compressor rotor 272 is combined with a second stage centrifugal compressor rotor 240 and a first stage centripetal turbine rotor 244 is combined with a second stage diagonal turbine rotor 278.

Figure 115:
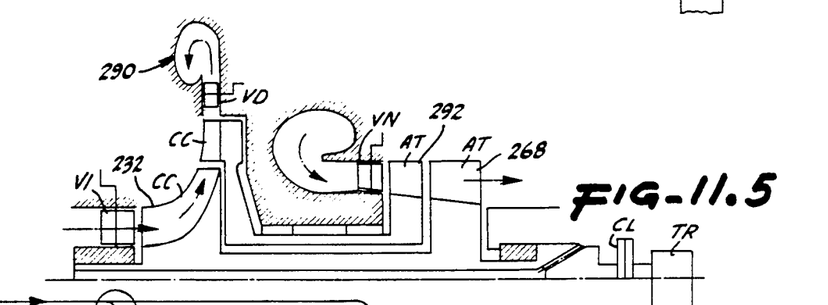

In the embodiment of the turboblower assembly 290 of FIG. 11.5 a mixed unit is shown with first and second stage centrifugal compressor rotors 232 and 241 coupled to a first stage axial turbine rotor 292 and a second stage axial rotor 268.

Figure 116:
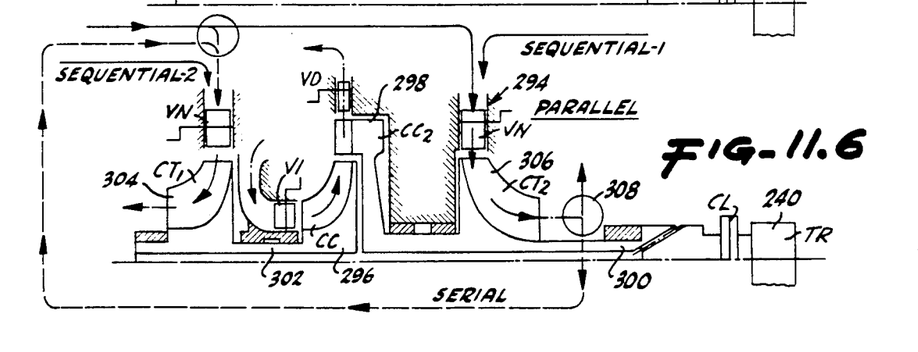

In the embodiment of FIG. 11.6 a turboblower assembly 294 is shown having a first stage centrifugal compressor rotor 296 and a second stage centrifugal compressor rotor 298 in which the second stage compressor rotor 298 is coupled to the shaft 300 that is connectable to the transmission 240 enabling the second stage compressor to be mechanically driven by the engine. The first stage compressor rotor 296 is connected to a shaft 302 on which is mounted a centripetal turbine rotor 304. Also, mounted on the shaft 300 of the second stage compressor 298 is a centripetal turbine rotor 306. The two rotors of the turbine stages can be driven in parallel by supplying combustion gases to both rotors from a common source, in a sequential manner by supplying the gases to one of the rotors or to the other, or in a serial manner by supplying the gases first to one of the rotors and then to the other. These three operating regimes are as shown by the alternate paths depicted in FIG. 11.6. Diversion and division of the gas is accomplished by valves 306 and 308.

Figure 117:
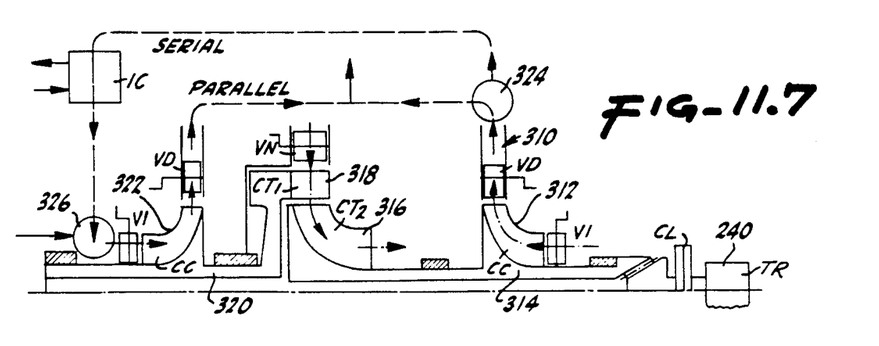

Similarly, the two stages of the compressor can be split as shown in the embodiment of the turboblower assembly 310 in FIG. 11.7. A first centrifugal compressor rotor 312 is connected to a shaft 314 that is connectable to the transmission 240 for mechanical coupling to the drive train of the engine. The shaft 314 is also connected to the second stage centripetal turbine rotor 316 with the first stage centripetal turbine rotor 318 connected to a free wheeling shaft 320. The shaft 320 also has a centrifugal compressor rotor 322 that can be operated either in parallel with the compressor rotor 312 or sequentially as a second stage to the compressor rotor 312 by operation of gas diversion and division valves 324 and 326.

In the turboblower assemblies having two counterrotating turbine rotors and two counterrotating compressor rotors, the matrix of variations is shown in the following table:

rotors of the combined compressor and turbine. In the preferred embodiments both the compressor and turbine sections of the unit have two stages with one stage of the compressor connectable to the engine drive train for mechanically driving the compressor to generate compressed air for the engine at low operating speeds. The interaction of the peripheral diameters of the central rotors and the internal diameters of the peripheral rotors forms a zone of high relative speed as a result of the counterrotating motion which represents the summation of both rotor speeds. The result on the entrained gases is a high compression or expansion ratio at a modest rate of rotation for the staged rotors, which is much lower than the structural stress limits for the rotors. Conventional turbo-chargers are optimized to operate efficiently for a single design point and in the remaining field of operation are either ineffectively utilized or penalized by the use of a "waste gate" system to prevent overrotation of the rotors.

Since a high level of compression or expansion can be achieved at modest rotor speeds by the turboblower of this invention, the rotors have a reserve capability that can be exploited to enable functioning at a wide variation of speeds for both sets of interconnected rotors allowing large variations in pressure and mass flow. This expanded capability permits optimization of air supply for developing high torque from the lowest r.p.m. to the highest r.p.m. Control of the turboblower performance is accomplished by varying the intake conditions and the diffuser geometry of the compressors, and the nozzle geometry of the turbine. The use of variable geometry orifice controls permits a continuous

| | COUNTER-ROTATING TURBO-POWER-COMPRESSORS | | | | |
|---|---|---|---|---|---|
| | COMPRESSORS | | TURBINES | | SPECIFICS |
| | LP-Stage | HP-Stage | HP-Stage | LP-Stage | Type |
| FIG. 11 | Low Pressure | High Pressure | High Pressure | Low Pressure | Stage connected to engine |
| FIG. 11.0 | Centrifugal Variable Intake | Centrifugal Variable Difuser | None | Centripetal Variable Nozzle | Turbo-compound Low pressure stage |
| FIG. 11.1 | Centrifugal Variable Intake | Centrifugal Variable Difuser | Centripetal Variable Nozzle | Centripetal | Turbo-compound Central Group Low Pressure Stage |
| FIG. 11.2 | Axial Variable Intake | Centrifugal Variable Difuser | Centripetal Variable Nozzle | Axial | Same |
| FIG. 11.3 | Diagonal Variable Intake | Diagonal Variable Difuser | Diagonal Variable Nozzle | Diagonal | Same |
| FIG. 11.4 | Diagonal Variable Intake | Centrifugal Variable Difuser | Centripetal Variable Nozzle | Diagonal | Same |
| FIG. 11.5 | Centrifugal Variable Intake | Centrifugal Variable Difuser | Axial Variable Nozzle | Axial | Same |
| FIG. 11.6 ALL GEOMETRIES ROTORS | Centrifugal Variable Intake | Centrifugal Variable Difuser | Centripetal Variable Nozzle | Centripetal Variable Nozzle | Turbo-Compound High-Pressure Group Exhaust Distributor Parallel/Serial Turbines |
| | Common Housing | | Separate Housings two turbines Double Mode of Operation | | |
| FIG. 11.7 ALL GEOMETRIES ROTORS | Centrifugal Variable Intake Variable Nozzle | Centrifugal Variable Intake Variable Nozzle | Centripetal Variable Nozzle | Centripetal | Turbo-Compound Low-Pressure Group Inter stage air cooler Distributor Parallel/Serial Compressor |
| | Separate Housing Double Mode of Operation | | Common Housing | | |

In FIGS. 11.0–11.5 the turboblower assemblies are characterized in having a common housing for both regulation of the mass flow and the pressure ratio which can be optimized for the engine operation in a range of different operating regimes.

The hybrid turboblower assembly of FIG. 11.6 is characterized by having three housings instead of the customary four housings for two stages of conventional turbochargers. The central common housing contains the two stages of the compressor which may be of geometries other than the centrifugal design disclosed. The two separated counterrotating turbines of all the geometries are contained in two housings. As noted the arrangement allows three basic modes of operation, parallel, serial and sequential.

The turboblower assembly of FIG. 11.7 is characterized by having three housings instead of the normal four housings for two stages of conventional turbocharges. The central housing contains the counterrotating turbines which may be of configurations other than the centripetal geometry disclosed. The separated counterrotating compressors which again may be of different configurations are contained in two housings. A principal characteristic of this arrangement is the ability to have two basic modes of operation, a parallel mode and a serial mode as previously described.

When an engine assembly includes a microprocessor for evaluating the operating conditions of the engine and controlling the operation of various components that contribute to the efficient operation, it becomes desirable to utilize the processor to control variable compressor components such as the variable intakes, diffusers and nozzles. The ability to monitor and adjust these control systems allows engine performance to be tuned to optimum operating conditions. The state of the art in automotive engine control has advanced from the electronic control of fuel injections systems to the electronic control of valve systems for regulating the air and gas flow through the engine. The recognition of the importance of air and gas flow has focused attention on the air delivery systems for supercharging the air supplied to the engine. The recent adaptation of turbochargers and blowers to automotive engines has demonstrated not only their success but their shortcomings. Attention is now being directed to the use of electronic systems for the electronic control of the air delivery components. The counterrotating turboblower disclosed herein is designed to provide the necessary flexibility in an air delivery component for all engine operating conditions and can be used in conjunction with the current state of the art control systems for regulating air and gas flow into and from the engine. This assembly is particularly suitable for the high pressure single cylinder opposed piston engine described herein where air is required to be highly compressed and where exhaust gases are discharged under high pressure.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An internal combustion engine comprising an engine housing including a cylinder with a circular cross section with opposed pistons reciprocal in the cylinder, and at least one fuel injector for injecting fuel into the cylinder, the cylinder having:

a central regional combustion chamber comprising a constricted portion of the cylinder with a central bore open to the opposed pistons for concentrating and mixing air compressed by the pistons and fuel injected by the injector, wherein the constricted portion of the cylinder is formed with a constriction collar having side faces, wherein the pistons each have a piston head with a top face portion that positions opposite and proximate one of the side faces when the pistons are at top dead center, wherein a squish of compressed air is forced from between the side face of the collar and the top face of the piston to improve turbulent mixing of fuel injected into the central regional combustion chamber, and wherein the collar forms a central bore having a cross sectional area that is non-circular such that the squish of compressed air forced from between the side face of the collar and the top face of the piston is not uniformly radially directed.

2. The engine of claim 1 wherein the side faces of the collar and the top face portion of the pistons are flat.

3. The engine of claim 1 wherein the central bore has a cross sectional area that is substantially square in configuration.

4. The engine of claim 1 wherein the central bore has a cross sectional area that is substantially triangular in configuration.

5. The engine of claim 1 wherein the central bore has a cross sectional area that is substantially clover shaped in configuration.

6. The internal combustion engine of claim 1 in combination with a unitary, counterrotating turboblower, wherein the engine has a drive train an exhaust means for exhausting combustion gases from the engine, and, the turboblower has a first compressor rotor with a first shaft connectable to the drive train of the engine and operable in a first rotary direction, a second compressor rotor with a second shaft, and a turbine rotor connected to the second shaft wherein the turbine rotor communicates with the exhaust means and drives the second compressor rotor in a rotary direction counter to the direction of rotation of the first compressor rotor by expanding exhaust gases with the compressor rotors having a common axis of rotation and being staged for compressing air for the engine wherein air compressed by one compressor rotor rotating in one direction is dischargeable directly to the other counterrotating compressor rotor.

7. The internal combustion engine of claim 6 wherein the turboblower has further a second turbine rotor connected to the first shaft.

8. The internal combustion engine of claim 7 wherein the turbine rotors are staged with exhaust gases in the rotor connected to the first shaft being further expanded in the second rotor.

9. An internal combustion engine comprising an engine housing including a cylinder with opposed pistons reciprocal in the cylinder, and at least one fuel injector for injecting fuel into the cylinder, the cylinder having:

a central regional combustion chamber comprising a constricted portion of the cylinder with a central bore open to the opposed pistons for concentrating and mixing air compressed by the pistons and fuel injected by the injector, wherein the constricted portion of the cylinder is formed with a constriction collar having side faces, wherein the pistons each have a piston head with a top face portion that positions opposite and proximate one of the side faces when the pistons are at top dead center, wherein a squish of compressed air is forced from between the side face of the collar and the top face of the piston to improve turbulent mixing of fuel injected into the central regional combustion chamber, and wherein the cylinder has intake ports proximate the top face portion of the piston head of one of the pistons when that piston is at bottom dead center and the cylinder, has exhaust ports proximate the top face portion of the other piston when that piston is at bottom dead center, the cylinder, the intake ports, and the exhaust ports each having an effective cross sectional area, wherein the collar forms a central bore with a cross sectional area which is smaller than the effective cross sectional area of the cylinder and larger than the effective cross sectional area of the intake ports which in turn is larger than the cross sectional area of the exhaust ports.

10. An internal combustion engine comprising an engine housing including a cylinder with opposed pistons reciprocal in the cylinder, and at least one fuel injector for injecting fuel into the cylinder, the cylinder having:

a central regional combustion chamber comprising a constricted portion of the cylinder with a central bore open to the opposed pistons for concentrating and mixing air compressed by the pistons and fuel injected by the injector, wherein the constricted portion of the cylinder is formed with a construction collar having side faces, wherein the pistons each have a piston head with a top face portion that positions opposite and proximate one of the side faces when the pistons are at top dead center, wherein a squish of compressed air is forced from between the side face of the collar and the top face of the piston to improve turbulent mixing of fuel injected into the central regional combustion chamber, wherein the internal combustion engine includes a first crank assembly connected to one of the opposed pistons and a second crank assembly connected to the other of the opposed pistons and the crank assemblies each have a cycle of operation with one cycle having a phase shift from the other cycle, wherein one piston has a top face portion that positions proximate the opposite side face of the constriction collar prior to the positioning of the top face portion of the other piston proximate to the other side face of the constriction collar wherein a sequential double squish of compressed air is forced from between the respective side faces of the collar and the top face portions of the pistons for further improved turbulent mixing of fuel injected into the central combustion chamber, and wherein the engine includes at least one additional fuel injector and means for sequentially injecting fuel into the central regional combustion chamber in timed coordination with the sequential double squish of compressed air in the cylinder with one fuel injector injecting fuel proximate the time of the first piston squish and with the other fuel injector injecting fuel proximate the time of the second piston squish.

11. The engine of claim 10 wherein the fuel injector means has control means for injecting a first fuel spray into the central regional combustion chamber for one of the injectors proximate the time of the first piston squish and injecting a second fuel spray into the central regional combustion chamber from the other of the injectors proximate the time of the second piston squish, the injection from the first injector continuing with the injection from the second injector.

12. The engine of claim 11 wherein the control means comprises a fuel supply system having electronic control valves and a processor for electronically activating the control valves.

13. The engine of claim 12 wherein the processor includes input sensing means for optimizing the activation of the control valves according to sensed engine conditions such as load, power, speed, emission content and operator demand.

14. The engine of claim 10 wherein the phase shift is approximately fifteen degrees of a three hundred sixty degree cycle.

15. An internal combustion engine comprising an engine housing including a cylinder with opposed pistons reciprocal in the cylinder, and at least one fuel injector for injecting fuel into the cylinder, a central regional combustion chamber comprising a constricted portion of the cylinder with a central bore open to the opposed pistons for concentrating and mixing air compressed, by the pistons and fuel injected by the injector, and comprising further a dual connecting rod assembly connected to each of the opposed pistons each connecting rod assembly having two connecting rods connected to counter-rotating crank shafts, each connecting rod having a wrist pin which in a paired arrangement form dual, rolling contact, wrist pins engageable as a pair with each piston, wherein the pistons have a piston assembly including:

an axially symmetrical piston head with a top face, a cylindrical side skirt and an internal, substantially spherical bearing surface;

a bearing structure having a complimentary spherical bearing surface in part slidably engageable with the spherical bearing surface of the head and including an internal contact bearing thrust surface engaging side by side, dual wrist pins in rolling contact with one another, and having further, spaced bridge sections with a bearing surface seating end portions of the dual wrist pins; and, a cylindrical closing skirt connected to the piston head side skirt, with an internal bearing surface engageable with the spherical bearing surface of the bearing structure, wherein the bearing structure has limited articulation with reference to the piston head and the closing skirt, and, the connecting rod wrist pins are seated in mutual rolling contact within the bearing structure and are articulatable therein.

16. The internal combustion engine of claim 15 wherein the piston head has a thermal cap seated on the top face of the piston head with air spaces therebetween for insulating the piston head from combustion gases.

17. The internal combustion engine of claim 16 wherein the piston head side skirt has a middle skirt coupled thereto, the middle skirt extension being connected to the closing skirt.

18. The internal combustion engine of claim 15 wherein the piston head and bearing structure include internal oil shaker chambers communicating with the spherical bearing surfaces and the bearing surfaces for the wrist pins.

19. In an internal combustion engine having a piston cylinder, spaced first and second counter-rotating crank shafts, first and second connecting rods having first ends connected to the first and second crank shafts and second ends having dual cylindrical wrist pins connected thereto, an improved piston assembly reciprocal in the piston cylinder comprising:

- an axially symmetrical piston head having a top face, a cylindrical side skirt and an internal spherical bearing surface;
- a bearing structure having an upper spherical bearing surface in engagement with the spherical bearing surface of the piston head, a central bearing surface in engagement with the wrist pins arranged side by side in the bearing structure in mutual rolling contact with one another, and a lower spherical bearing surface; and,
- an axially symmetrical closing skirt having means for connecting the closing skirt to the piston head, the closing skirt having an outer cylindrical surface and an inner spherical bearing surface in engagement with the lower spherical bearing surface of the bearing structure, wherein the piston head and closing skirt are articulatable on the bearing structure and, in combination, are axially symmetrical for uniform deformation by thermal and structural stress.

20. The improved piston assembly of claim 19 wherein the piston head includes an axially symmetrical thermal cap on top of the top face with means for connecting the thermal cap over the top face with air spaces between the top face and cap.

21. The improved piston assembly of claim 19 wherein a projected surface area of the upper spherical bearing surface of the bearing structure is maximized.

22. The improved piston assembly of claim 19 wherein a projected surface area of the central bearing surface of the bearing structure is maximized.

23. The improved piston assembly of claim 22 wherein the piston head side skirt has a middle skirt coupled thereto, the middle skirt being connected to the closing skirt.

24. The internal combustion engine of claim 19 wherein the piston head and bearing structure include internal oil shaker chambers communicating with the spherical bearing surfaces and the bearing surfaces for the wrist pins.

25. A unitary, counterrotating turboblower in combination with an internal combustion engine having at least one cylinder with at least one piston reciprocal in the cylinder wherein the piston and cylinder in part form a working combustion chamber, an air intake system, a combustion gas exhaust system, and a drive train connected to the piston, the turboblower comprising:

- a first compressor rotor with a first shaft connectable to the drive train of the engine and operable in a first rotary direction for delivering compressed air to the intake system of the engine,
- a second compressor rotor with a second shaft,
- a turbine rotor connected to the second shaft of the second compressor rotor, the turbine rotor communicating with the combustion gas exhaust system and driving the second compressor rotor in a rotary direction counter to the rotation of the first compressor rotor by expanding exhaust gases in the turbine rotor with the compressor rotors having a common axis of rotation and being staged for compressing air for the engine wherein air compressed by one compressor rotor rotating in one direction is dischargeable directly to the other counterrotating compressor rotor.

26. The turboblower of claim 25 wherein first and second compressor rotors are staged with compressed air in one compressor rotor being further compressed by the other compressor rotor.

27. The turboblower of claim 25 wherein the turboblower has further a second turbine rotor connected to the first rotor shaft.

28. The turboblower of claim 27 wherein the turbine rotors are staged with exhaust gases in one turbine rotor being further expanded in the other turbine rotor.

29. The turboblower of claim 25 wherein the turboblower has further a second turbine rotor connected to the first rotor shaft, wherein the first and second compressor rotors are staged with the compressed air in one compressor rotor being further compressed by the other compressor rotor, and wherein the turbine rotors are staged with exhaust gases in one turbine rotor being further expanded in the other turbine rotor.

30. The turboblower of claim 25 comprising further means for regulating the flow of compressed air through the compressor rotors and means for regulating flow of combustion gases through the turbine rotor.

* * * * *